US010417672B2

(12) United States Patent
Garcia

(10) Patent No.: US 10,417,672 B2
(45) Date of Patent: Sep. 17, 2019

(54) MEDIUM FOR CREATING STANDARDIZED SHARED SERVICE OFFERINGS WITH TEMPLATE FOR CUSTOM UNIQUE PRICES

(71) Applicant: John Andrew Garcia, West Hills, CA (US)

(72) Inventor: John Andrew Garcia, West Hills, CA (US)

( * ) Notice: Subject to any disclaimer, the term of this patent is extended or adjusted under 35 U.S.C. 154(b) by 0 days.

(21) Appl. No.: 15/274,931

(22) Filed: Sep. 23, 2016

(65) Prior Publication Data

US 2018/0089726 A1   Mar. 29, 2018

(51) Int. Cl.
*G06Q 30/00* (2012.01)
*G06Q 30/02* (2012.01)
*G06Q 30/06* (2012.01)
*G06Q 30/04* (2012.01)

(52) U.S. Cl.
CPC ......... *G06Q 30/0283* (2013.01); *G06Q 30/04* (2013.01); *G06Q 30/0641* (2013.01)

(58) Field of Classification Search
CPC . G06Q 30/0283; G06Q 30/04; G06Q 30/0641
USPC ...................................................... 705/27.1
See application file for complete search history.

(56) References Cited

U.S. PATENT DOCUMENTS

| 7,693,750 | B2 | 4/2010 | Christensen | |
|---|---|---|---|---|
| 8,533,857 | B2 * | 9/2013 | Tuchman | H04L 63/104 726/28 |
| 9,292,575 | B2 * | 3/2016 | Bose | G06F 16/24556 |
| 9,710,827 | B2 * | 7/2017 | Crolley | G06Q 30/0261 |
| 2009/0228305 | A1 * | 9/2009 | Gustafsson | G06Q 30/02 705/4 |
| 2011/0060627 | A1 * | 3/2011 | Piersol | G06Q 10/06395 705/7.31 |
| 2012/0058107 | A1 | 3/2012 | Tang | |
| 2012/0130725 | A1 * | 5/2012 | Cooper | G06Q 10/10 705/1.1 |
| 2013/0173347 | A1 * | 7/2013 | Davis | G06Q 30/0206 705/7.35 |
| 2014/0052576 | A1 * | 2/2014 | Zelenka | G06Q 30/00 705/26.41 |
| 2014/0241330 | A1 * | 8/2014 | Thanigaivel | H04W 4/02 370/338 |
| 2015/0052009 | A1 * | 2/2015 | Ketchell, III | G06Q 30/0633 705/26.8 |

(Continued)

OTHER PUBLICATIONS

A Web services implementation framework for financial enterprise content management (Year: 2004).*

*Primary Examiner* — Jeffrey A. Smith
*Assistant Examiner* — Lalith M Duraisamygurusamy
(74) *Attorney, Agent, or Firm* — Plager Schack LLP; Mark H. Plager; Alexis J. Saenz

(57) ABSTRACT

A system and process provides online service providers with a platform to list services. The platform provides standardized templates for various business categories and service segments associated within each category. The electronic templates allow providers to conveniently enable/disable service offerings and input price, service tiers, and optional upgrades by toggling settings. The listing data is then received by the host and available to be listed through an online marketplace which may be presented to mobile application users. A search query by a consumer returns service listings that can be compared one to one by price a service offered.

5 Claims, 7 Drawing Sheets

(56) References Cited

U.S. PATENT DOCUMENTS

2015/0378975 A1* 12/2015 Wu .................. G06F 17/243
715/226
2016/0171469 A1* 6/2016 Pugh ................ G06Q 20/20
705/16
2016/0299636 A1* 10/2016 Lindenberg .......... G06F 3/0481

* cited by examiner

MEDIUM FOR CREATING STANDARDIZED SHARED SERVICE OFFERINGS WITH TEMPLATE FOR CUSTOM UNIQUE PRICES

CROSS-REFERENCE TO RELATED APPLICATIONS

None.

BACKGROUND

The embodiments herein relate generally to systems and processes for creating standardized shared service offerings with customized unique prices.

The field of providing the purchase of online services is often limited by the technology on the back end that limits the ease of use and flexibility of creating and managing purchasable services. Typically a service is displayed on a website or mobile app with a static description of the service and a static price associated with the service. The back end part of the process is limited in this manner because each business' service offerings are managed on a one-to-one basis with price and the host server is merely coordinating payment for the selected service added to an electronic shopping cart. A service provider must typically build a website of mobile app and define services and pricing for each service. Updating service offerings and pricing typically requires the service provider to contract with a web/app developer to open the site code and revise the code for updated data. There is usually a delay (often days) in updating the information because of the time needed to update code and the backlog in the developer's schedule.

As a result of individual businesses building separate sites for services, competitors will offer similar services but in many, if not most cases, not the same service. Typically, there is a difference in details of the service provided between competitors. Thus, there will be a price difference between the similar services from competitors making it difficult for the end consumer to compare services and prices.

As can be seen, there is a need for a system and process that provides the consumer flexibility in selecting and comparing between competing sources of a service during online shopping. To this end, a system and process that enables service providers to easily, efficiently, and cost effectively offer "shared" services while at the same time incorporating unique prices for such shared services is needed.

SUMMARY

In one aspect of the subject technology, a computer program product for hosting an online marketplace platform for services comprises a non-transitory computer readable storage medium having computer readable program code embodied therewith. The computer readable program code is configured to: establish within a host server of the platform, a business segment of a business category; establish business segment services associated with the business segment; associate properties with the business segment services including a description of a service and a pricing field associated with the service; generate an electronic template of the business segment services using the associated properties of the business segment services; provide to a service provider, through a network connection, an electronic user interface for managing a selected business segment and associated business segment services, wherein the electronic user interface includes a setting to toggle on/off selected services by service providers; receive by the host server from one of the service providers, user interface data indicating one or more services being enabled by the setting to toggle on/off selected services; and attach the enabled service and associated properties to said service provider's profile.

In another aspect, a computer program product for hosting an online marketplace platform for services, comprises a non-transitory computer readable storage medium having computer readable program code embodied therewith, the computer readable program code being configured to: manage a business service online portal by a host server; establish within a host server of the platform, a business segment of a business category; establish business segment services associated with the business segment; associate properties with the business segment services including a description of a service and a pricing field associated with the service, a price type associated with the service, and upgrade options associated with the service; generate of the business segment services using the associated properties of the business segment services; bundle the business segment services associated with the business segment into an electronic template and an electronic user interface for managing a selected business segment and associated business segment services, wherein the electronic user interface includes: a setting to toggle on/off selected services, manage pricing of toggled on selected services, modify service offerings, and modify service regions in which a toggled on services is offered; provide to a service provider, through a network connection, the electronic template and the electronic user interface; receive by the host server from the service providers, user interface data indicating one or more services being enabled by the setting to toggle on/off selected services; and attach the enabled service and associated properties to the service provider's profile.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
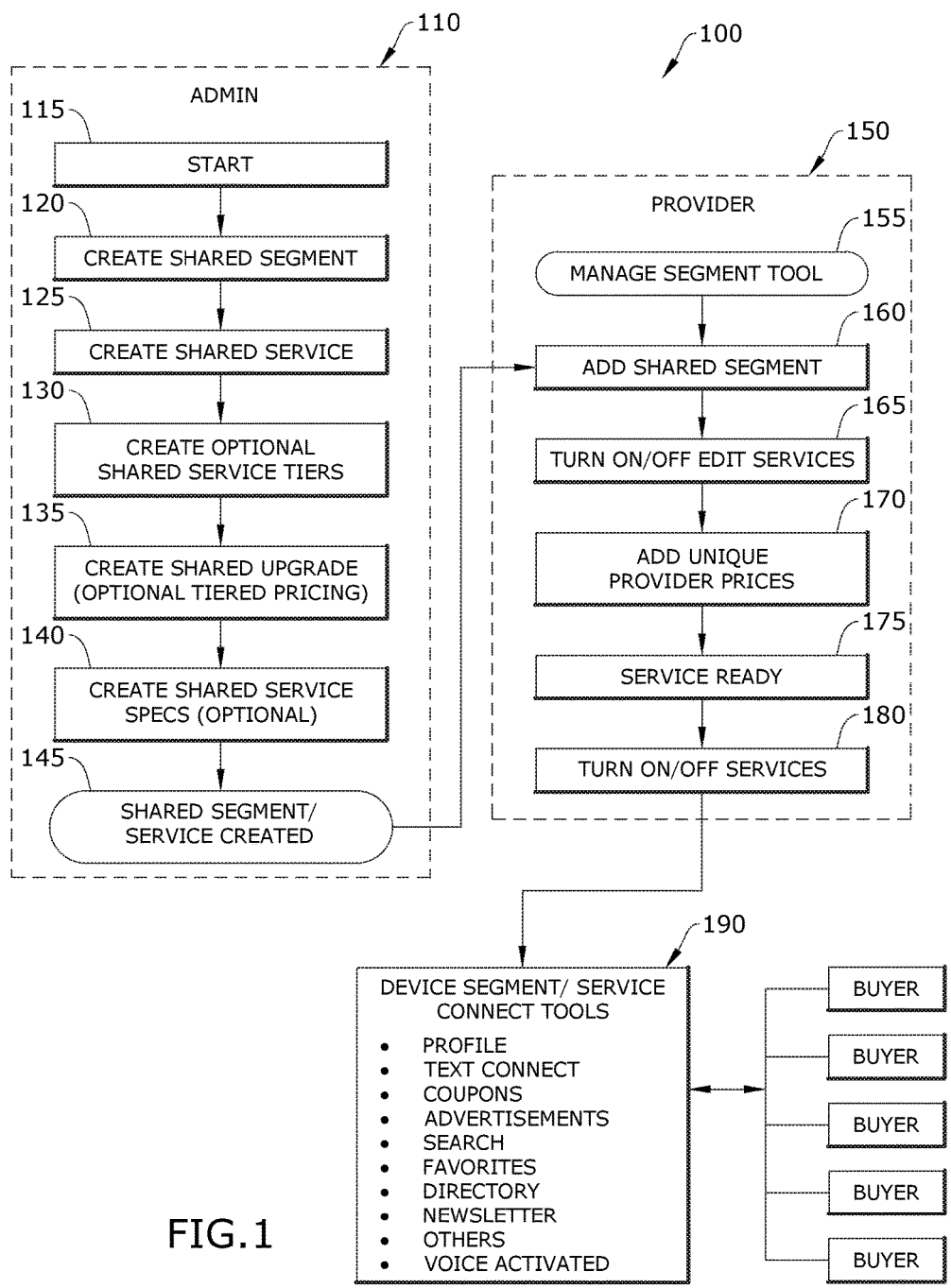
FIG. 1 is a flowchart of a process for providing business service segment listings according to an embodiment of the subject technology.

In general, embodiments of the disclosed subject technology solve problems associated with online marketplaces and more particularly with providing products or services from competing businesses in a manner that allows the end consumer to compare competing products and services more accurately. As described above, conventional online marketplaces offer a service with a static price associated with a static product offering. Competitors will often try to differentiate themselves from each other by varying the service offered to justify the price discrepancy. Aspects of the subject technology disclosed below overcome this deficiency in the online marketplace by for example, providing a back end process that allows providers to select through a user interface (UI), a business segment (via template) and automatically adds related services. In an exemplary embodiment, a centralized business service platform is provided to independent service providers to turn on services at their discretion one by one using unique online pricing through the UI for a list of standardized services, including service tiers which enable a service provider to more precisely associate a price with a service and a consumer to choose services specific to their service need in many instances. The UI provides a list of services that can be toggled on/off along with a price associated for each enabled (offered) service and ongoing service management. From the consumer end, the host server may provide an interface that displays a list of service providers for a similar service with pricing among the same kind of service provider from a single list.

In an exemplary embodiment, a shared services template and associated service properties is provided which makes it easy to manage service for providers. A shared service offering makes it easy for new service providers to quickly and easily offer their services to the public. Furthermore, a shared service offering makes it easy for the public to compare prices for a list of disparate and unrelated service providers. The shared services template also provides a platform for providers to create more personalized and custom service offerings using a predefined service segment avoiding the costly and difficult to maintain process of generating a website/mobile app interface for each new service that current approaches use.

A manage services tool allows service providers to access a broad array of business segments and related business segment services to attach to their profile for sale to the public. Many service providers do not have the financial resources, knowledge, or ability to properly get their local services onto the internet to connect with consumers. Bundling services with segments makes it easy for service providers to quickly and easily add a variety of shared services to their profile. Adding shared services to a provider service offering one by one is cumbersome and time consuming. Exemplary embodiments disclosed herein provide preset bundled services that allow providers to select, price, and associate region of service on the fly thus eliminating the time and expense of website creation or mobile app construction. The manage services tool also allows service providers to add custom prices to the shared service template makes it easy for consumers to compare prices against any service provider who uses the shared services.

A business category may have multiple business segments and services predefined for offering in the template. In an exemplary embodiment, an ON/OFF toggle feature makes it easy for service providers to enable only those services that may be available, legal in their local area or jurisdiction along with offering those services that are in line with their area of specialty. The template may also be configured to provide service tier offerings which allows for providers to better align a consumer need with a provider price. The service tiers allows for things like size, or type of a consumer service requirement to be factored into the service provider pricing tool. EG the type of car (SUV, Sedan, or Motorhome) will cause the price of the service to vary.

Service upgrades may be bundled with the service or service tier. Templates may match prices with tier specific upgrades which further enhances the ability to quickly and easily enable the shared upgrades which further enhances the service offering to meet consumer needs and where the manage services tool makes it easy and fast for service providers.

Services associated with a provider profile may be connected to a service region where consumers who reside in the service region can connect with the service provider. This makes it easy for consumer to connect only with those service providers who will realistically provide services. For example, for a house call type service, the service region feature may display only providers that are likely to actually go to the consumer's house to perform a service and excludes all other service providers.

Figure 2:
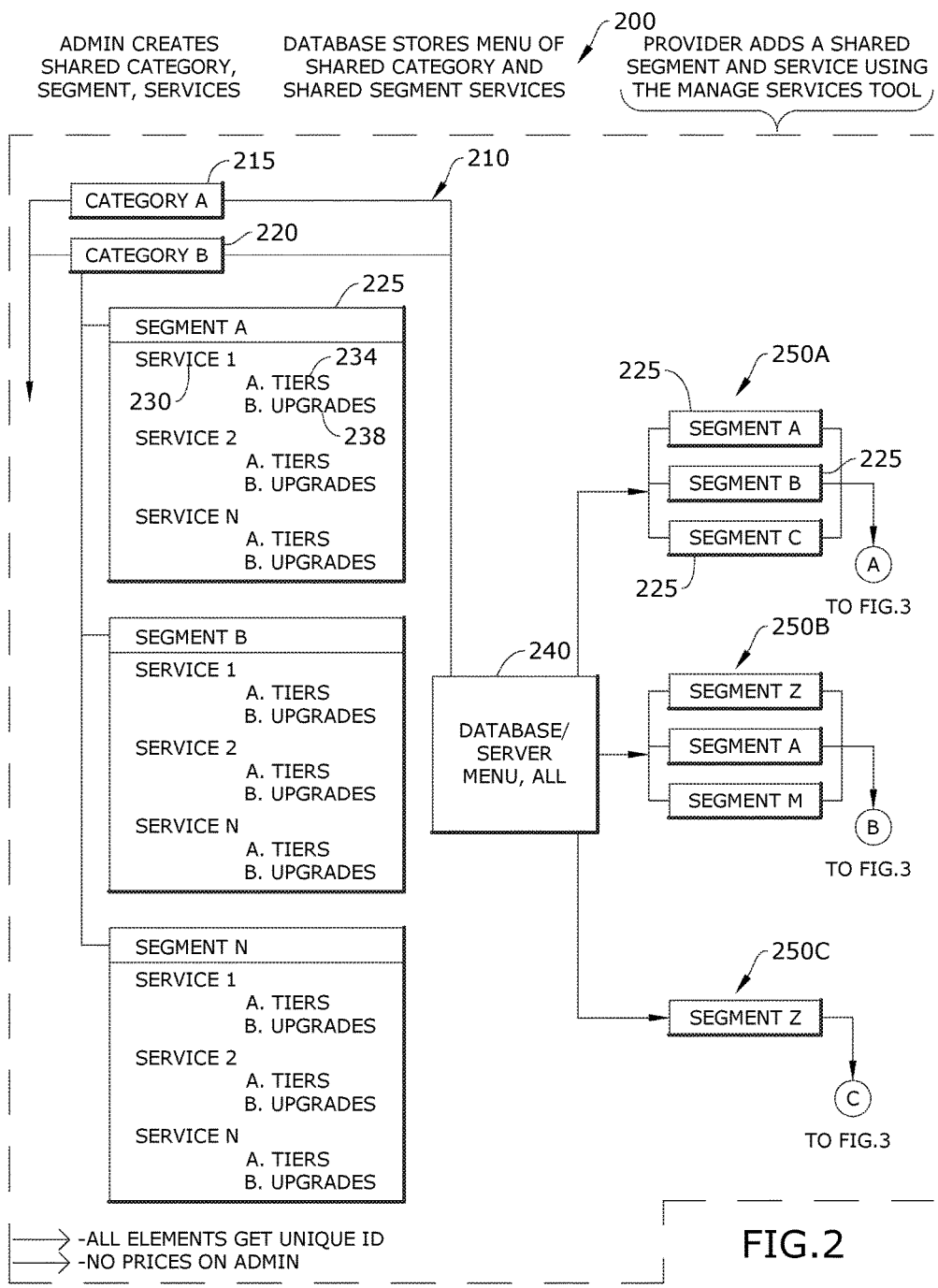
FIGS. 2 and 3 are a block diagram of a process for generating online business service segment listings according to an embodiment of the subject technology.
Figure 3:
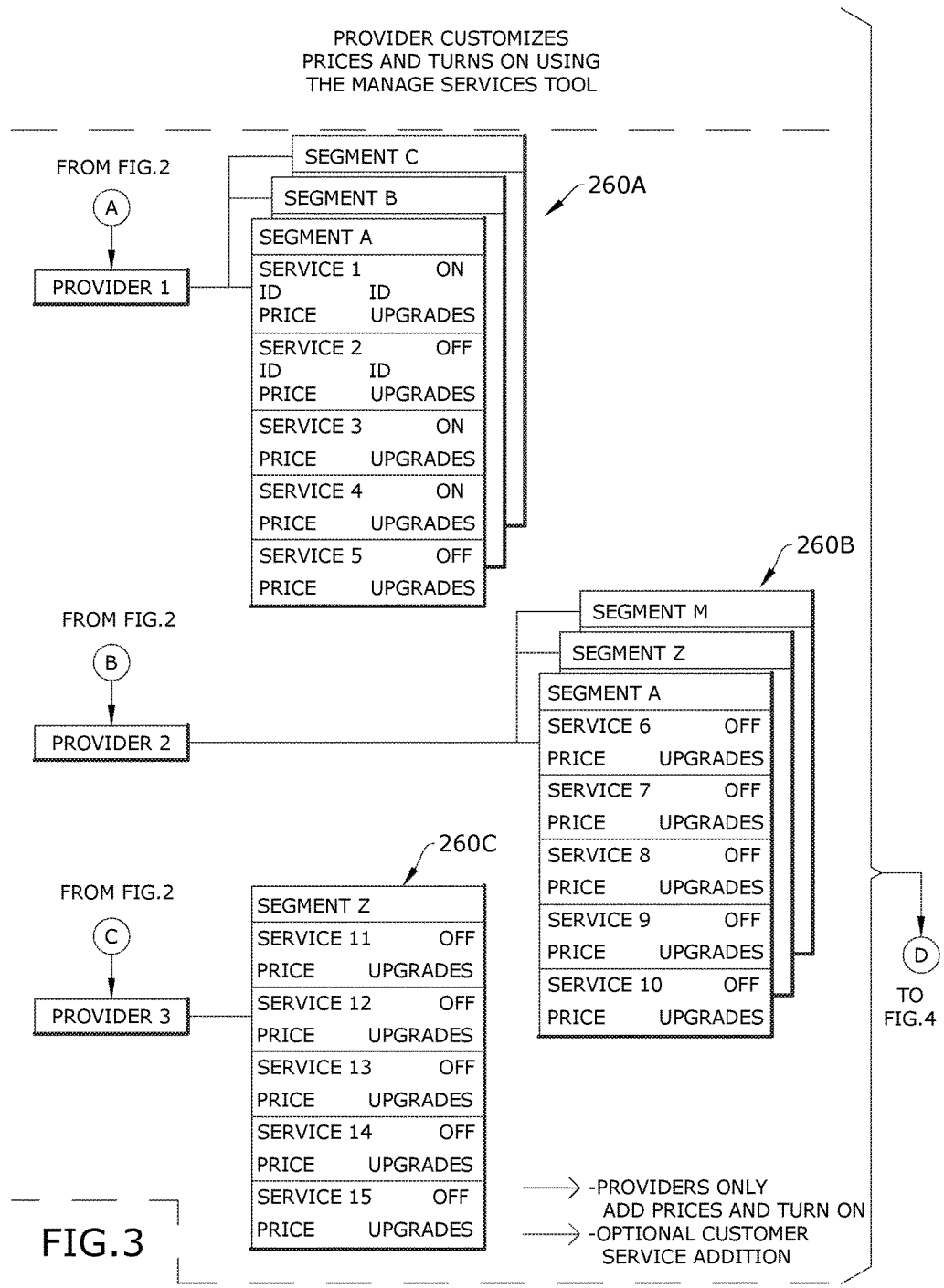

Referring now to FIG. 1 along with FIGS. 2 and 3 concurrently, a process 100 for providing segmented services for an online marketplace is shown according to an exemplary embodiment of the subject technology. FIGS. 2 and 3 show a block diagram 200 of the flow for generating business service segment listings with additional detail related to the steps in FIG. 1. The process 100 is generally a back end process that provides consumer end users with a listing of services and service providers. In an exemplary embodiment, the list of services generated by the process 100 uses a standardized list of services and related options so that service providers are provided with facilitated means to list a service for sale through a centralized electronic platform. In general, the process 100 includes an administrator section 110, a service provider section 150, and device segment/service connect tools section 190. The results of the process sections 110, 150, and 190 are provided to the consumer end user (shown as a list of buyers).

The administrator section 110 generates a business segment template (in the form of an electronic file) for a service. The administration section 110 starts 115 by creating 120 a shared business segment 225 (section 210 of FIG. 2). A shared business segment may be for example, a category 215 or 220 of related business services. For example, a segment may refer to automotive services which may include businesses related to mechanical repair, body repair, washing and detailing, and equipment/accessory installation. A shared service 230 may be created 125. For sake of illustration only a single segment 225 and service 230 are called out. As an example, FIGS. 5-8 show user interfaces for a business segment generated for automotive washing and detailing services. However it will be understood that various segments and services (for example, the related services described above) may be established for the category 220. The shared service segment 225 may include multiple services 230. Once a shared service 230 is established, shared service tiers 234 may be created 130. In some embodiments, shared upgrades 238 may be created 135 to be listed with the service 230 for selection by the end consumer user. In some embodiments, shared service specifications may be created 140. Shared service specifications include for example, associating a bid type with the service so that service providers can accurately attach their prices to the service, service tier, and/or upgrades. The platform enable a bid type to be either fixed or per unit and is updatable through the fields at the user's convenience. As may be appreciated this is a significant feature offered over current systems that offer a static pricing entry that is entered separately for each service as defined by each provider on separate sites. The shared service model disclosed here allows a single interface for all service providers of a same service with flexibility in pricing structure for unique offerings reached through a shared platform. Shared service specifications also include for example, optional features such as associating an invoice type with a service, or an appointment type with a service. For example, some services require a service provider to show up at a precise time or they are considered late whereas other services allow the service provider to show up within an agreed upon "time window. Using the information established above, the shared business segment and service template is created 145. The template may be stored in a host server database module 240.

A service provider (represented by section 150) may access the database module 240 for a business service template to offer services online. The provider may manage 155 offered services by adding 160 a shared service segment 255 from the database module 240, which may be accessed by a software application operable for example, by a mobile computing device interface. For sake of illustration, three service providers 250 are shown: providers 250A, 250B, and 250C. The platform may allow each provider 250 to offer shared service segments 225 (for example Segments "A" and "Z") and some unique service segments 225 (Segments "B" and "M" that the other two providers 250 do not have. For a selected segment 225, the provider may enable/disable/edit 165 services to be listed. For enabled services, the provider may edit services and add 170 a price to each service. Once each service by the provider is up to date, the provider may turn on (or off) 180 the service for listing. Service providers may return to the module 240 at their convenience to modify and edit their prices associated with a shared service offering. Consumers will then always be able to see most recent up to date prices on the platform.

Figure 5:
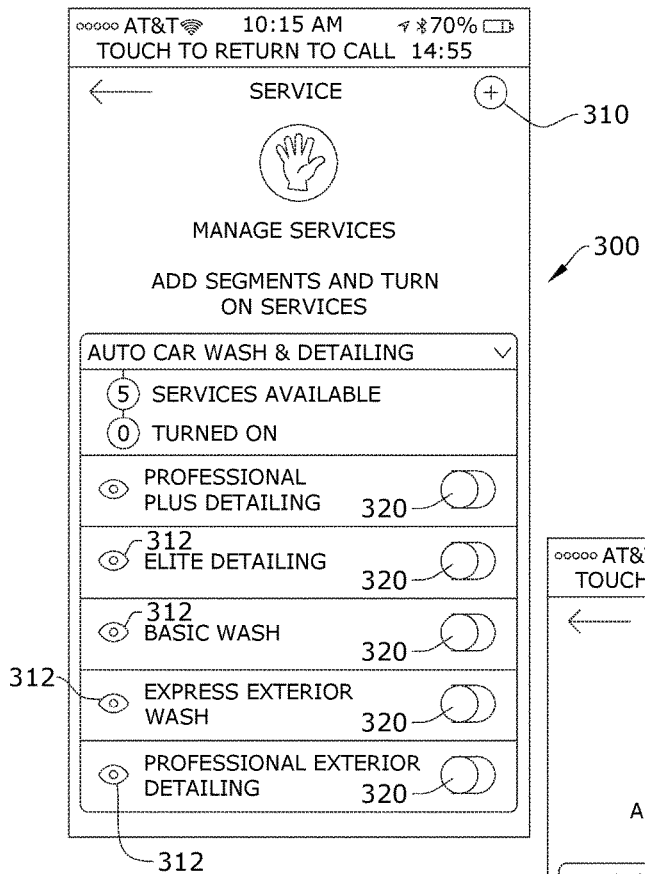
FIG. 5 is a screenshot of a user interface showing a service provider side host of standardized segmented services which can be toggled on/off for listing in an online marketplace according to an embodiment of the subject technology.
Figure 6:
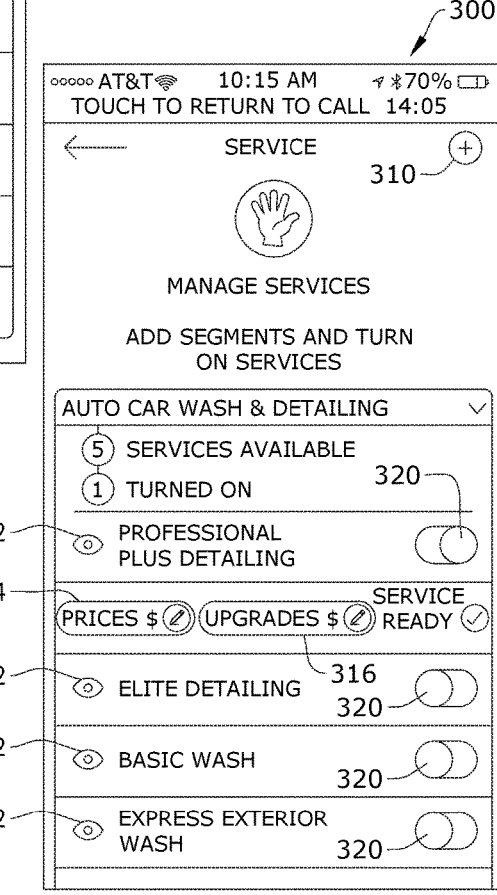
FIG. 6 is a screenshot of the user interface of FIG. 5 showing a service segment enabled and priced according to an embodiment of the subject technology.

Referring to FIG. 3 along with FIGS. 5-6, user interfaces 260 (shown as 260A, 260B, and 260C for respective providers 250A, 250B, and 250C from FIG. 2) show the service providers which services for a business segment are enabled along with the price associated with each service and a field to access upgrades to a service. FIG. 5 shows an example of a service provider service management user interface 300. The interface 300 may display a button 310 to add a service segment and turn on/off services for a segment. The interface 300 may represent for example one of the user interfaces 260 from FIG. 3. The user interface 300 shows a business segment related to automotive car wash and detailing. The service provider may be presented with a summary of the amount of services that can be enabled for sale (including how many services are already enabled for the provider's account) along with a field for each service. A service provider may press a selection button 312 for a given service which may activate a pop-up window under the service field entering a price (in field 314) for a selected service to be offered and selecting a predetermined upgrade 316 to the service. Once the services are selected along with pricing, the service provider only needs to toggle the electronic setting 320 on to enable offering the service. In FIG. 6, the toggle button 320 for the field labeled "PROFESSIONAL PLUS DETAILING" is shown as shifted to the right and represents the service as enabled (toggled on). As may be appreciated this is much more convenient than having to update HTML, Java® or other code to show each individual service offered along with price. Moreover, the aspects disclosed above make it easy for a business to update pricing without having to request code to a mobile app to be updated to reflect the price change. Thus service providers may offer pricing deals throughout the day and change back to standard pricing after a deal is over at an instant. It will be further appreciated that several services can be managed easily from the single management platform with the same ease because a standardized format may be used for all segments and related services.

Figure 7:
FIG. 7 is a screenshot of a consumer side user interface of a service provider mobile app service listing according to an embodiment of the subject technology.
Figure 8:
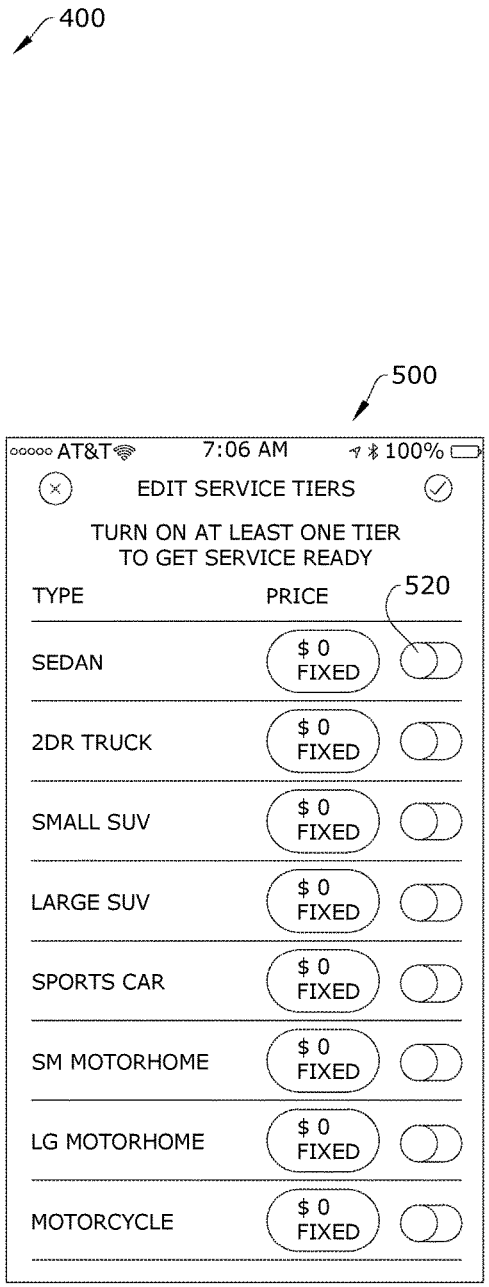
FIG. 8 is a screenshot of a consumer side user interface for selecting a service(s) from the service provider of FIG. 7 according to an embodiment of the subject technology.

In an exemplary embodiment, additional features including service tier organization may be included in the business segment customization described above. FIG. 7 shows a consumer side user interface 400 that displays a selected service purchasable online. The interface 400 shows as an example the selection of a service ("EXPRESS EXTERIOR WASH") that was setup from the provider side in FIGS. 5 and 6. The interface 400 includes a description of the selected service along with pricing options depending on the type of automobile the consumer wishes to be washed. FIG. 8 shows a service provider user interface 500 that provides a template of service tiers for a service type that allows the provider to easily set pricing and enable by switching the toggle button 520 on.

Figure 4:
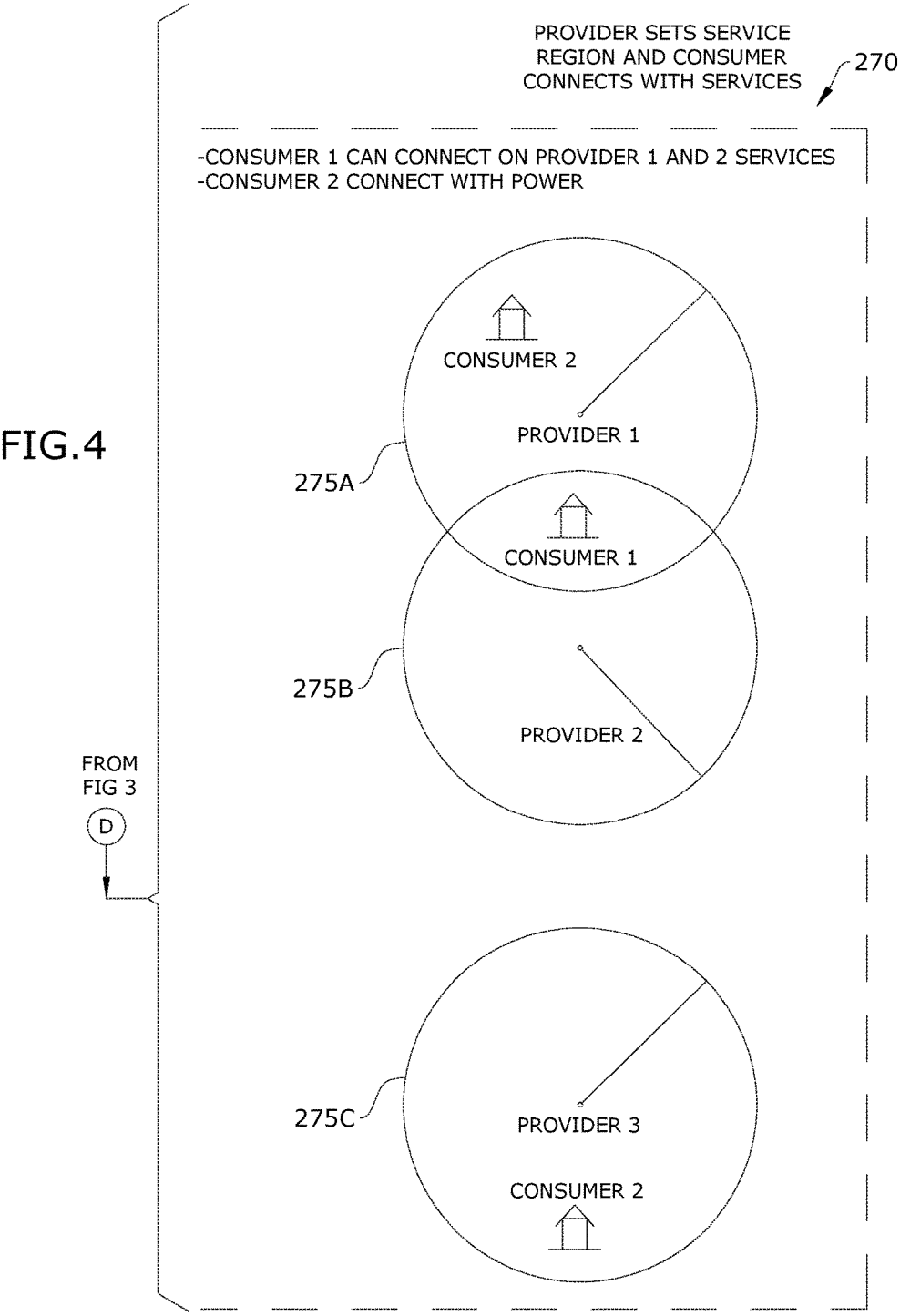
FIG. 4 is a schematic of a geolocation map of service providers located relative to end consumers according to an embodiment of the subject technology.

Referring now to FIG. 4, an electronic geolocation map 260 may be displayed in response to a consumer side search query for a service. Each provider may set up a service area based on a predetermined radius from the service location. The host server may determine which of providers 275A, 275B, and/or 275C are closest to consumers requesting services. In some instances a consumer (for example, Consumer 1) may be within the area of multiple providers (as shown for example, 275A and 275B). Thus Consumer 1 may be presented on a mobile application interface a list of services providers from which to compare services and prices.

Once the provider has turned ON a service or services the device segment/service connect tools module 190 includes tools the consumer uses to connect with the service provider for services that are turned on using the manage services tool so that they can then purchase services. For example, when a provider turns on a service, a consumer can then access a provider profile and see those services that are on and purchase those services. A consumer can use search tools or use coupons to connect with a provider and its services.

Figure 9:
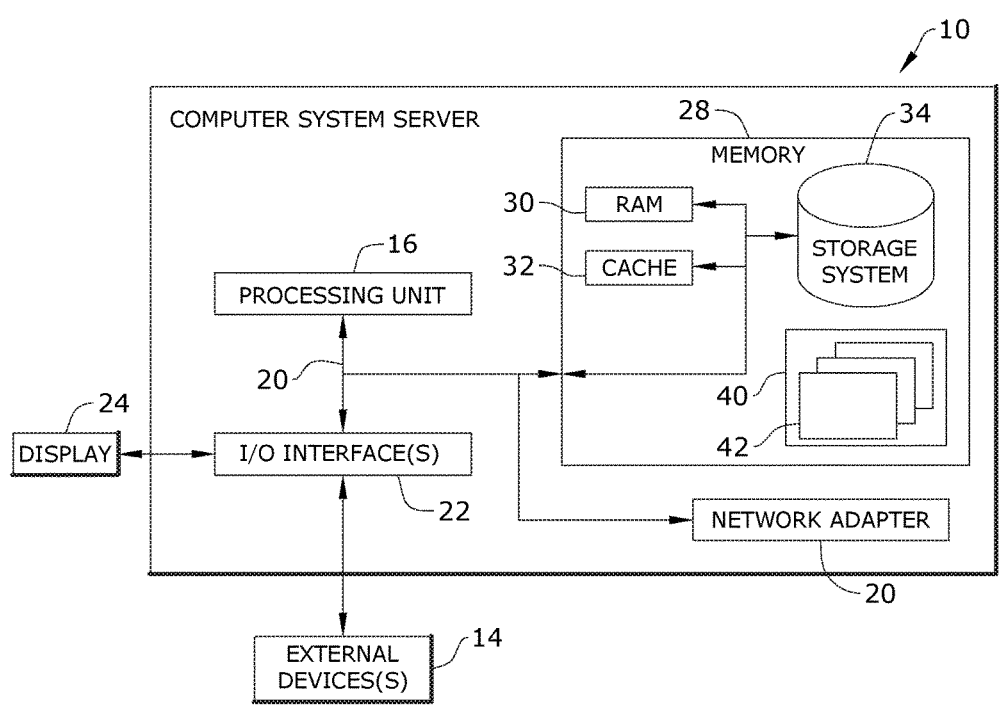
FIG. 9 is a block diagram of a computer system/server according to an embodiment of the subject technology.

Referring now to FIG. 9, a schematic of an example of a computer system/server 10 is shown. The computer system/server 10 is shown in the form of a general-purpose computing device. The computer system/server 10 may serve the role as the machine implementing for example the functions of storing computer program product embodiments of the subject technology, generating business service segment templates, storing service provider information, storing service provider service data, hosting an online platform, and matching up consumer searches with service providers by area. The components of the computer system/server 10 may include, but are not limited to, one or more processors or processing units 16, a system memory 28, and a bus 18 that couples various system components including the system memory 28 to the processor 16.

The computer system/server 10 may be for example, personal computer systems, tablet devices, mobile telephone devices, wearable computing devices, server computer systems, handheld or laptop devices, multiprocessor systems, microprocessor-based systems, set top boxes, programmable consumer electronics, network PCs, and distributed cloud computing environments that include any of the above systems or devices, or voice enabled devices and the like. The computer system/server 10 may be described in the general context of computer system executable instructions, such as program modules, being executed by a computer system (described for example, below). As a host server providing the online platform, in some embodiments, the computer system/server 10 may be an intermediary computing device hosting information provided by and managed by service providers which are provided in turn to consumer end users. Other functions of the host server embodiment include providing electronic payment processing between service providers and consumers. In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device. The system memory 28 may include at least one program product 40 having a set (e.g., at least one) of program modules 42 that are configured to carry out the functions of embodiments of the invention. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described above.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for generating customized pricing of in-common business service offerings through an online marketplace platform for direct comparison of the in-common business services by consumers, the computer program product comprising a non-transitory computer readable storage medium having computer readable program code embodied therewith, the computer readable program code being configured, when executed by a processor, to:

establish within a host server of the platform, a database of business categories, business segments within each business category, services within each business segment, service tiers associated with each of the services, and service providers by geographic location;

generate, within the host server, a service provider electronic user interface template for display on a first mobile computing device, accessible to a plurality of service providers through a network connection to the platform;

generate for display in the service provider electronic user interface template, in response to a first request by one of the service providers, a plurality of tiered fields for receiving service information properties associated with business services provided by the service provider, the tiered fields including:
- a first tier of the business categories retrieved from the database,
- a second tier of the business segments, each business segment being a subcategory of a respective first tier business category,
- a third tier of the business services, each business service being a subcategory of a respective second tier business segment and in-common to service providers in the same business segment,
- a fourth tier of the service tiers, each service tier being a subcategory of a respective third tier business service, wherein each service tier includes a description of service details performed in-common to service providers in the same business segment and a pricing associated with the service tier;

generate a selectable toggle on/off feature, displayed on the service provider electronic user interface template, for each business service tiered field, enabling a plurality of the business services within a business segment for the one service provider in response to a second request by the one service provider, to be displayed in association with the one service provider;

generate a pricing field for each enabled business service where a service provider inputs his unique price with a selected business service tier;

store in the host server platform, the user input entry with respective enabled business services;

store in the database, the geographic location of the service provider for each tiered field with an enabled business service;

generate for display on a second mobile computing device, a customer electronic user interface, in response to a customer service request query by a consumer for a selected service to the host server through the platform;

trigger by the processor, a determination in response to the customer service request query, determining service providers that have a service area that includes the location of the consumer;

display on the customer electronic user interface, a list of service providers providing the selected service tier associated with the business service that have a service area that includes the location of the consumer;

retrieve from the database, the business services enabled by respective service providers in the displayed list; and display on the customer electronic user interface, for each service provider in the displayed list of service providers, each of the enabled business services along with the service tiers available within each enabled business service.

2. The computer program product of claim 1, further comprising computer readable program code being configured to include in the service provider electronic user interface template a field to provide an appointment window for scheduling the service.

3. The computer program product of claim 1, further comprising computer readable program code being configured to include in the service provider electronic user interface template a field to enable upgrade options associated with the service.

4. The computer program product of claim 1, wherein the pricing field is configured to receive a bid type price based on either a fixed rate or a per unit rate.

5. The computer program product of claim 1, wherein the service provider electronic user interface template includes an invoice type field for offering a form of invoicing to customers.

* * * * *